United States Patent
Yasan et al.

(10) Patent No.: US 8,165,806 B2
(45) Date of Patent: Apr. 24, 2012

(54) VEHICLE COMPASS USING TELEMATICS UNIT AND VEHICLE SENSOR INFORMATION

(75) Inventors: Eray Yasan, Canton, MI (US); Sethu Madhavan, Canton, MI (US); Chaminda Basanyake, Windsor (CA); Craig Markyvech, Romulus, MI (US); Abhijit Patil, Westland, MI (US)

(73) Assignee: General Motors LLC, Detroit, MI (US)

( * ) Notice: Subject to any disclaimer, the term of this patent is extended or adjusted under 35 U.S.C. 154(b) by 1207 days.

(21) Appl. No.: 11/864,291

(22) Filed: Sep. 28, 2007

(65) Prior Publication Data

US 2009/0088974 A1  Apr. 2, 2009

(51) Int. Cl.
G01C 21/00 (2006.01)
G01C 21/20 (2006.01)
G01S 5/00 (2006.01)

(52) U.S. Cl. .......................... 701/472; 701/469; 701/483

(58) Field of Classification Search ............... 701/210, 701/214, 220, 221, 224, 217, 216; 340/995.21, 340/995.25
See application file for complete search history.

(56) References Cited

U.S. PATENT DOCUMENTS

| | | | | |
|---|---|---|---|---|
| 5,394,333 A * | 2/1995 | Kao | ............... | 701/217 |
| 5,644,317 A * | 7/1997 | Weston et al. | ............ | 342/357.31 |
| 5,740,049 A * | 4/1998 | Kaise | ............... | 701/217 |
| 5,906,655 A * | 5/1999 | Fan | ............... | 701/216 |
| 6,091,359 A * | 7/2000 | Geier | ............... | 342/357.31 |
| 6,775,616 B1 * | 8/2004 | Nysen | ............... | 701/300 |
| 6,792,352 B1 * | 9/2004 | Hoffmann et al. | ............ | 701/213 |
| 7,222,007 B2 * | 5/2007 | Xu et al. | ............ | 701/38 |
| 7,286,933 B2 * | 10/2007 | Cho | ............... | 701/216 |
| 7,437,230 B2 * | 10/2008 | McClure et al. | ............... | 701/50 |
| 7,957,897 B2 * | 6/2011 | Basnayake | ............... | 701/501 |
| 2002/0128775 A1 * | 9/2002 | Brodie et al. | ............... | 701/216 |
| 2002/0198655 A1 * | 12/2002 | Bevly et al. | ............... | 701/213 |
| 2003/0040849 A1 * | 2/2003 | Hathout et al. | ............... | 701/1 |
| 2004/0186644 A1 * | 9/2004 | McClure et al. | ............... | 701/50 |
| 2005/0049787 A1 * | 3/2005 | Cho | ............... | 701/216 |
| 2005/0086002 A1 * | 4/2005 | Keppler et al. | ............... | 701/213 |
| 2005/0149240 A1 * | 7/2005 | Tseng et al. | ............... | 701/38 |
| 2006/0025894 A1 * | 2/2006 | O'Connor et al. | ............... | 701/1 |
| 2007/0088477 A1 * | 4/2007 | Brewer et al. | ............... | 701/41 |
| 2007/0219720 A1 * | 9/2007 | Trepagnier et al. | ............ | 701/300 |

OTHER PUBLICATIONS

U.S. Appl. No. 11/770,898, filed Jun. 29, 2007, General Motors Corporation.

* cited by examiner

*Primary Examiner* — Khoi Tran
*Assistant Examiner* — Jason Holloway
(74) *Attorney, Agent, or Firm* — Leydig, Voit & Mayer, Ltd.

(57) ABSTRACT

A software compass used during a GPS outage calculates vehicle heading and presents it upon request. The software compass gathers information from a yaw rate sensor, wheel steering angle sensor, wheel speed sensor, and PRNDL gear position sensor to calculate vehicle heading using a weighting algorithm. Because the yaw rate sensor data is a central factor in calculating vehicle heading, the quality of calibration of the yaw rate sensor is of importance. The disclosed calibration algorithm calculates the yaw rate bias and scale factors to calibrate the yaw rate sensor.

15 Claims, 4 Drawing Sheets

300

Calibration Algorithm for Yaw Rate Bias and Scale Parameters

Equation 1

$$\underset{305}{\Phi_i} = \underset{310}{\Phi_{i-1}} + \underset{315}{S} \, ( \underset{320}{\delta\Phi_i} - \underset{330}{B)} \, \underset{325}{dT}$$

Equation 2

$$\underset{340}{\underset{335}{\min(S,B)}} \, \Sigma(i=1,N) \, \underset{345}{\alpha_i^2} \, (\underset{350}{GPS_i} - \underset{355}{S} \times ( \underset{360}{Sensor_i} - \underset{365}{B}))$$

FIG. 3

VEHICLE COMPASS USING TELEMATICS UNIT AND VEHICLE SENSOR INFORMATION

BACKGROUND OF THE INVENTION

One of the fastest growing areas of communications technology is related to automobile network solutions. Many existing automobiles have had telematics devices installed, and many new cars are now being provided with at least some level of telematics service when sold. Commensurate with the increasing number and variety of these services, demands on telematics service call centers have also grown.

Telematics services include, but are not limited to, turn-by-turn directions and other navigation-related services provided in conjunction with GPS based chipsets and components, and airbag deployment notification and other emergency or roadside assistance-related services provided in connection with various crash and collision sensor interface modules and sensors located throughout the vehicle. Telematics services also include "infotainment-related" services wherein music, Web pages, movies, television programs, video games and/or other content are downloaded by an "infotainment center" operatively connected to the telematics unit. For example, music content may be downloaded for current or later playback. In addition, a telematics unit may provide vehicle location and heading information to a subscriber.

One of the most important aspects of telematics services is the ability to guide a user based on their current position. This service relies, however, on the ability to accurately determine a vehicle's or telematics unit's current position. Typically, as noted above, this is accomplished via known GPS technologies. However, in instances where GPS signals are unavailable or unreliable, the unit may use "dead reckoning" to navigate based on vehicle data collected while the vehicle was at a reliably known position, e.g., a last good GPS location.

BRIEF SUMMARY OF THE INVENTION

In overview, the invention aids in identifying a vehicle location and/or heading during a GPS outage and presenting the information to a telematics subscriber directly (e.g., in response to a location query) or indirectly (e.g., using such information to serve a guidance demand) upon request. A software compass gathers information from a yaw rate sensor, wheel steering angle sensor, wheel speed sensor, and gear position (PRNDL) to calculate vehicle heading using a weighting algorithm.

The yaw rate sensor may be a gyroscope ("gyro") or other mechanical, micro-mechanical, or solid state sensor that detects a rate of angular change in the yaw axis of a vehicle. As in avionics, the yaw axis is an axis passing through the vehicle perpendicular to a horizontal plane. Although the yaw axis is referred to traditionally as if it were a single fixed axis, it will be appreciated that as a vehicle moves while yawing, it typically does not actually rotate about a fixed axis. However, within a moving frame of reference the yaw axis can be envisioned as a fixed vertical axis through the vehicle.

The yaw rate is directly related to, and is therefore of importance in calculating, the vehicle heading. Therefore, calibrating the yaw rate sensor from a GPS before a GPS outage is crucial. In one aspect, the disclosed principles provide an improved calibration algorithm that calculates the yaw rate bias and scale factors to calibrate the yaw rate sensor, resulting in improved angular rate resolution during dead reckoning, allowing more accurate determination of heading and location.

BRIEF DESCRIPTION OF THE SEVERAL VIEWS OF THE DRAWING(S)

FIG. 3 is mathematical diagram illustrating the procedures used in the calibration algorithm of the yaw rate sensor.

DETAILED DESCRIPTION OF THE INVENTION

Before describing the invention in detail, an exemplary environment in which the invention may operate will be described. It will be appreciated that the described environment is for purposes of illustration only, and does not imply any limitation regarding the use of other environments to practice the invention.

Figure 1:
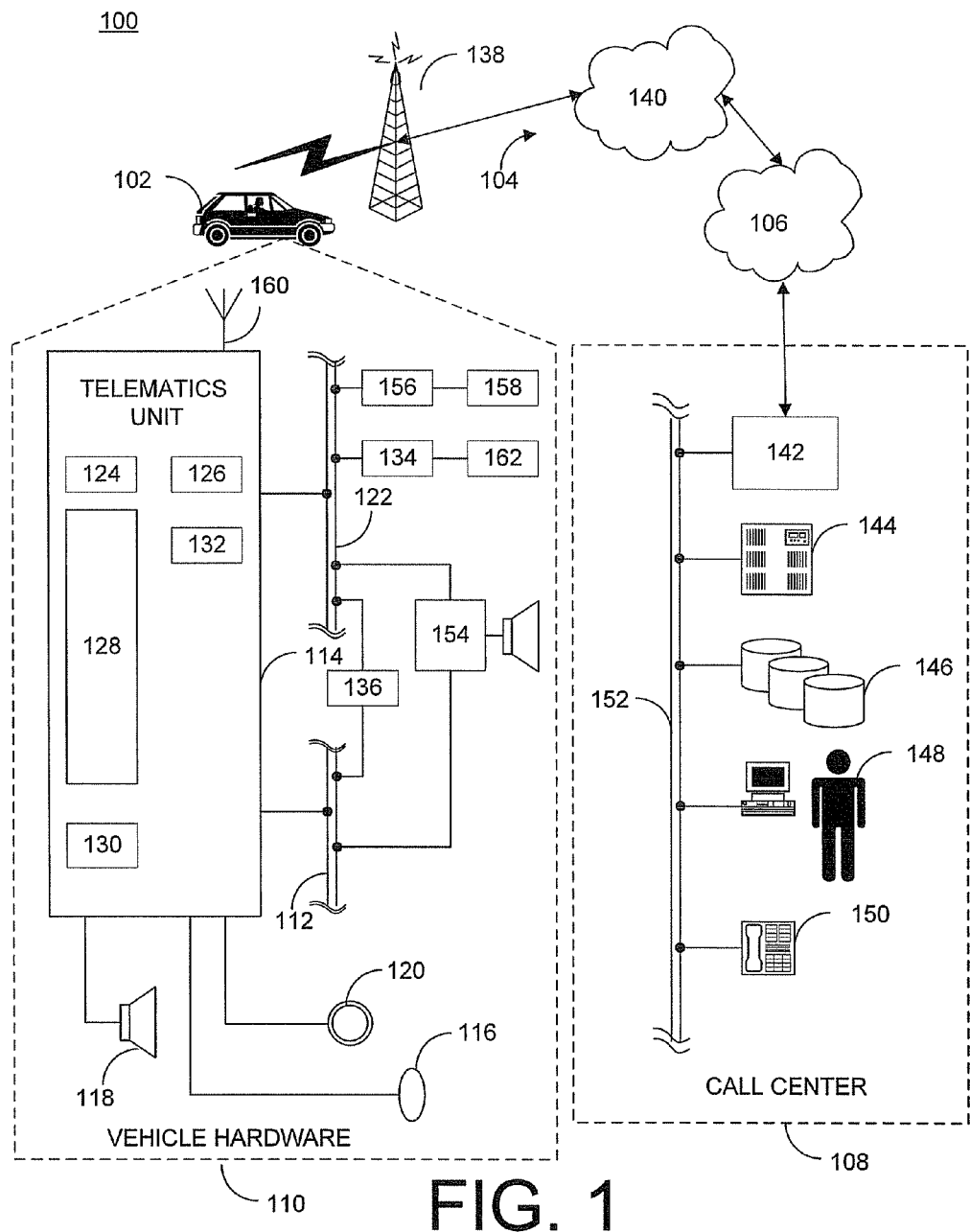
FIG. 1 is a schematic view of an example communication system within which examples of the disclosed techniques and systems may be implemented.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and/or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error rate can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 162 [note: vehicle sensor box attached to box 134 needs to be changed to 162], connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

As noted above vehicle position and guidance information are important to some users. For example, current location and heading can be used to generate a map of directions to a second location, and updates of these parameters during travel serve to indicate the user's location along the route. Moreover, some emergency response functions require knowledge of the target vehicle's location. GPS technology is generally used to provide vehicle heading and location information. However, GPS technology, while generally very reliable, may not always be able to provide the needed information. For example, when a plurality of signals is required for location resolution and one or more signals is faulty or missing, the GPS system may not function properly. There are certain areas known as "blind" zones where GPS signals are regularly unavailable due to local electromagnetic or physical interference or outage.

To calculate location and heading information during a GPS failure or in a blind zone, many GPS systems rely on dead reckoning (DR). The DR process combines satellite measurements with additional sources of location information such as inertial gyroscopes, accelerometers, compass information, and wheel speed sensors. These data when combined predict the relative current location to the last known location of a vehicle (expressed as a latitude and longitude) when GPS measurements are either unreliable or unavailable.

Accurate speed and heading information are important in order to reliably predict (for at least short periods of time) changes in vehicle velocity and direction. Traditionally, a telematics unit is installed with an expensive automotive grade magnetic compass. The disclosed principles provide for a software "compass" to determine a telematics equipped vehicle's heading for presentation to a user or service provider during GPS unavailability. The software compass uses vehicle information, e.g., information gathered from three position and/or rate sensors and PRNDL ("Park, Reverse, Neutral, Drive, Low) gear position, in conjunction with weighting algorithms to calculate vehicle heading. It will be appreciated the PRNDL sensor may sense gear conditions in addition to or instead of some or all of Park, Reverse, Neutral, Drive, and Low gear position, and that the acronym PRNDL simply refers to any gear selection device. For example, it would include a system having only Reverse, Park and Drive gears.

The three sensors in the illustrated example include a yaw rate sensor, a wheel steering angle sensor, and a wheel speed sensor. As noted above, the yaw rate is generally particularly significant in calculating heading because the yaw rate directly determines the predicted angle of turn for the vehicle. In one aspect, the disclosed principles reveal an improved calibration system for the yaw rate "bias" and "scale" parameters used in yaw rate sensor data processing.

Figure 2:
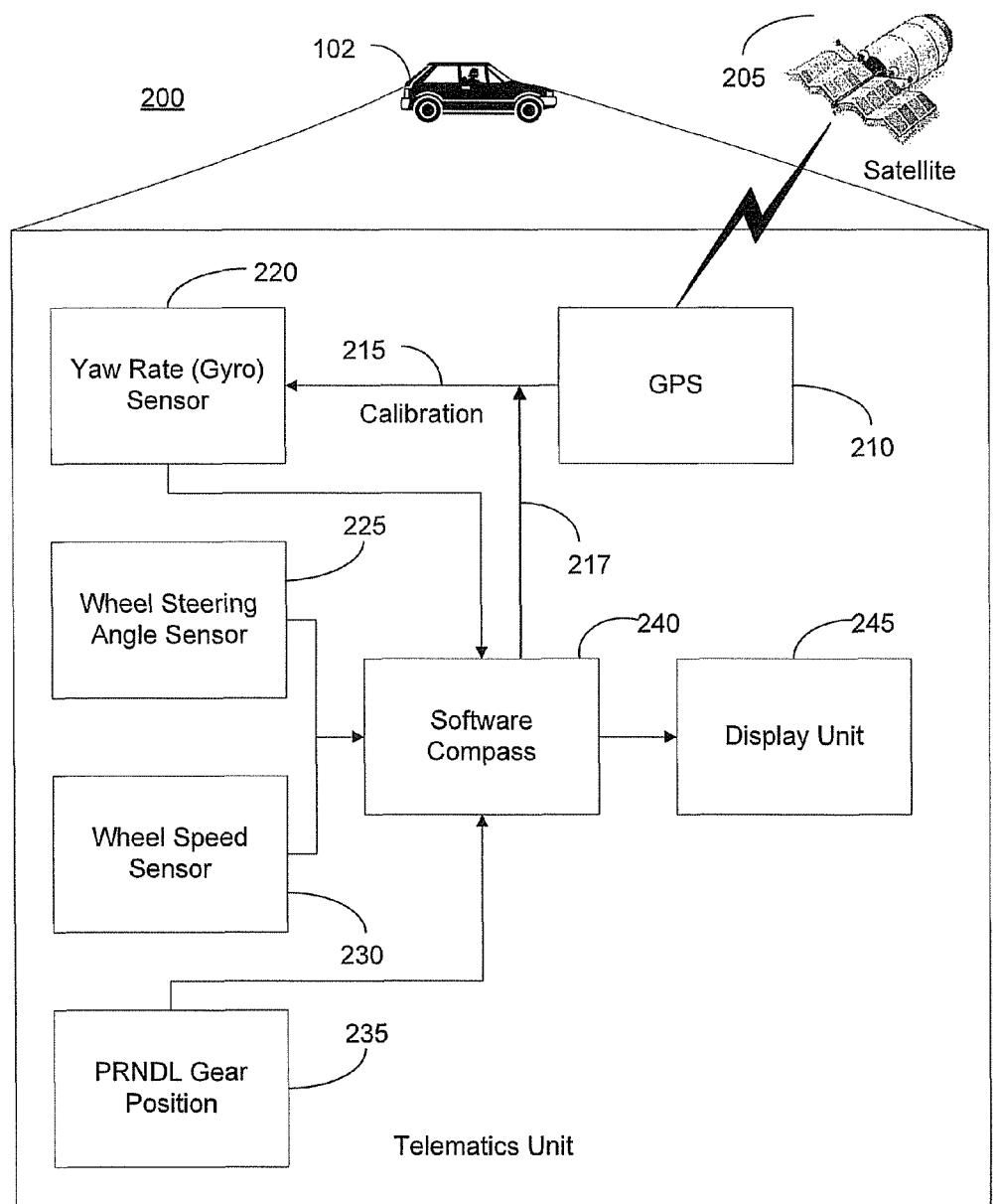
FIG. 2 is a general architectural overview of an exemplary embodiment of the disclosed techniques.

FIG. 2 is a general architectural overview 200 of an exemplary implementation of the disclosed principles. In the illustrated example, the software compass 240 resides in the memory 130 of the telematics unit 114 and is implemented by the telematics unit's central processing unit 128. The software compass 240 accesses sensor and gear position information across the vehicle bus 122.

The GPS system 210 within the telematics unit 114 provides location and heading information of the vehicle 102 by reference to external sources, e.g., from satellite signals 205. While GPS service at the vehicle's location is functional and reliable, the software compass 240 uses GPS information to calibrate the yaw rate sensor 220, e.g., via links 215, 217. Subsequently during a GPS outage, a telematics subscriber may request heading information or guidance that requires such information, or an emergency condition may occur that requires such information to alleviate the outage.

Beginning at least at the point in time that GPS service becomes unavailable or unreliable, the software compass 240 gathers information from the yaw rate sensor 220, wheel steering angle sensor 225, wheel speed sensor 230, and PRNDL gear position sensor 235. The software compass 240 then uses a weighting algorithm incorporating the sensor information and gear position data to calculate vehicle heading and present it to a display unit 245 or otherwise provide it for consumption, i.e., to a dead reckoning process.

As noted then, the yaw rate sensor 220 output may be used to calculate vehicle heading during periods of dead reckoning. However, this requires the initialization of the heading to correspond with the absolute coordinate system since the yaw rate represents a relative heading change, e.g., a rate of change from a given initial heading, and does not in and of itself provide an absolute heading. In one implementation, the yaw sensor 220 provides an analog voltage output that varies with the yaw rate of the sensor platform which is typically fixed with respect to the vehicle. The conversion of this output voltage to a yaw rate is typically done by assuming a substantially linear relationship between the output voltage of the sensor and its yaw rate relative to the platform. Typically, most errors associated with the use of yaw rate sensors are directly related to the translation of the sensor output voltage output to a yaw rate (scale factor) and bias in the sensor output (actual bias as well as bias stability). Ignoring or incorrectly accounting for bias error typically results in continuous growth of heading error and often has the potential to be the predominant error source associated with yaw rate detection.

The yaw rate scale factor is typically defined as a linear conversion factor (e.g., a 0.027 V output voltage change at a 5.0 V input voltage corresponds to 1 deg/sec yaw rate). However low-cost sensors may have significant variability of the scale factor and any unaccounted scale factor error can result in over or underestimating turns. Automotive-grade sensors may exhibit considerably high scale factor error, sometimes also known as sensitivity error. The bias and scale factor error corrections are thus significant for providing accurate heading estimates.

In one implementation, the novel algorithm disclosed herein calibrates both bias and scale factor using the same set of data and does not require specific maneuvers to be performed to achieve calibration. It requires a yaw rate and a GPS heading. FIG. 3 is diagram 300 showing the formulas used in the calibration algorithm of the yaw rate sensor. In Equation 1, $\Phi_i$ and $\Phi_{i-1}$ (305, 310) represent headings of the vehicle recorded at time i and i−1 from the GPS system. The scale factor is S (315) and $\delta\Phi i$ (320) is the yaw rate at time i. The yaw rate bias is B (325) and the yaw sensor sampling interval is dT (330). The calibration algorithm attempts to estimate the bias and scale such that a minimum (335) is reached in the model given in Equation (2). The model minimizes with respect to S and B (335), and sums from i=1 to N (340). The number of data points is N (340) while $\alpha_i$ is the relative importance of epoch i (345). $GPS_i$ is the GPS heading at time i and $Sensor_i$ is the yaw-based heading derived using Equation 1. The model given in Equation 2 also allows the inclusion of relative importance weights for individual observations in the calibration dataset. For instance, if outlier heading observations are detected in the GPS heading dataset those data points can be assigned lesser weights or even be ignored in the parameter optimization process.

Figure 4:
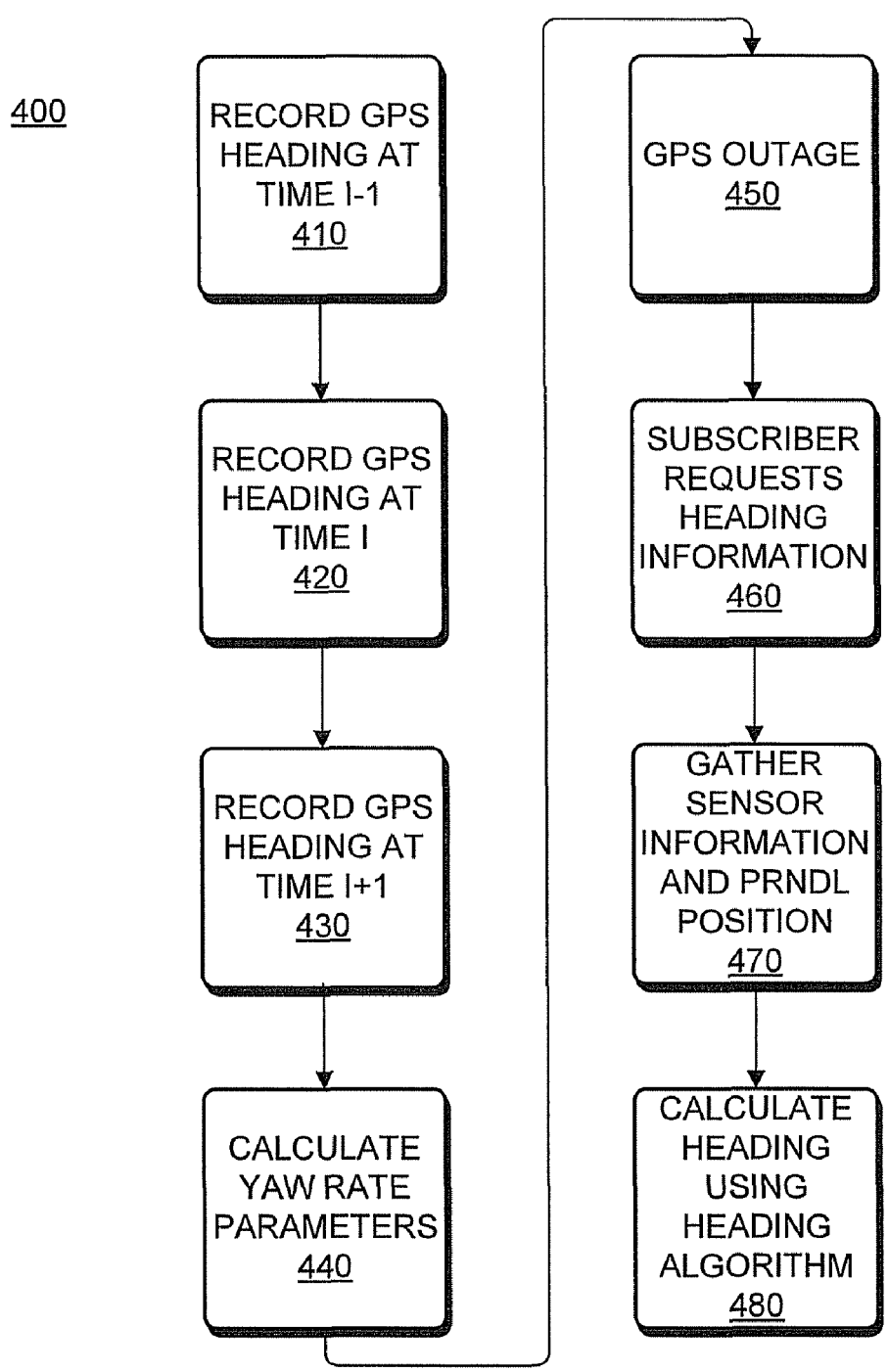
FIG. 4 is a flow diagram illustrating an exemplary method of calculating heading using a software compass according to the disclosed principles.

FIG. 4 is a flow diagram 400 illustrating an exemplary method of calculating heading using a software compass in keeping with the foregoing principles. At stages 410, 420, and 430, the telematics unit records the GPS heading information at times i−1, i, and i+1, respectively. At a next stage 440, the software compass 240 implemented by the telematics unit's CPU calculates the yaw rate bias and scale factor parameters according to the equations in FIG. 3 or equivalent equations or equation sets. The software compass 240 then calibrates the yaw rate sensor according the parameters, i.e., accounting for the calculated bias and scale factors. At a next stage 450, which may occur at any time after calibration, it is assumed that a GPS outage occurs. Subsequently at stage 460, a subscriber requests (or other vehicle operations or condition cause to be requested) vehicle heading information. It will be appreciated that whether the request for heading information may come soon after, during, or long after the outage, the dead reckoning described in steps 470 et seq. begins immediately following the outage. In other words, regardless of when the heading information is needed, the dead reckoning analysis is relative, i.e., it is based on a series of updates from prior positions, the first of which is a known good GPS-based position.

At a next stage 470, the telematics CPU gathers sensor information and PRNDL gear position across the vehicle bus 122. At a next stage 480, the CPU calculates the vehicle heading information using the weighted algorithm and presents it. If the information has not yet been requested, the heading information is used only to calculate a position update from which another update cycle is begun by returning to stage 470. Otherwise, the information may also be provided to requester, e.g., the subscriber, an emergency notification system, a mapping algorithm, etc., either through a display unit or an audio system in the case of notification subscriber, or via a wired or wireless link in the other cases.

In this manner, the improved calibration system improves the reliability of dead reckoning and serves to ameliorate the problems caused by GPS outage conditions. All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A vehicle position detection system for using a telematics unit and vehicle sensor information to estimate a current vehicle position, the system comprising:
   a yaw rate sensor that measures an angle of turn of the vehicle;
   a wheel steering angle sensor that measures the angle at which one or more vehicle wheels are turned;
   a wheel speed sensor that measures a speed of rotation of one or more wheels of the vehicle;
   a gear position sensor that senses a current gear condition of a transmission of the vehicle;
   a global positioning system that provides vehicle location and heading; and
   a software compass application that calibrates the yaw rate sensor using at least yaw rate parameter values provided by: the yaw rate sensor, the wheel steering angle sensor, and wheel speed sensor, and
   wherein the compass application calibrates the yaw rate sensor by applying a minimization algorithm to a function of a scale factor and a yaw rate bias, and
   wherein the yaw rate sensor is used to estimate vehicle heading information in the absence of GPS location information.

2. The vehicle position detection system according to claim 1, further including a display unit to present a parameter related to the vehicle heading information.

3. The vehicle position detection system according to claim 1, wherein the gear position sensor is adapted to sense at least a Forward gear position, a Reverse gear position and Park gear position of the vehicle transmission.

4. The vehicle position detection system according to claim 1, wherein the telematics unit includes a vehicle positioning system for calculating a current vehicle position in the absence of GPS data based at least in part on the estimated vehicle heading.

5. The vehicle position detection system according to claim 1, wherein the telematics unit comprises:
   a central processing unit implementing the software compass application;
   a memory module that stores the software compass application; and
   a vehicle bus across which the software compass application gathers sensor and gear position information.

6. A method, carried out by a computer, for detecting a vehicle location parameter using internally-referenced vehicle sensor information, the internally-referenced vehicle sensor information comprising at least yaw rate information from a yaw rate sensor, the method comprising the steps of:
   recording a GPS-based vehicle location at a first time moment;
   gathering first yaw rate parameters including yaw rate sensor data, wheel steering angle sensor data, wheel speed sensor data, and gear position data;
   calibrating the yaw rate sensor with a software compass application by reference to the GPS-based vehicle location and the first yaw rate parameters, wherein the compass application calibrates the yaw rate sensor by applying a minimization algorithm to a function of a scale factor and a yaw rate bias, and;

at a second time moment after calibration of the yaw rate sensor, detecting a GPS outage such that GPS position data is unavailable;

after the second moment, gathering second yaw rate parameters including yaw rate sensor data, wheel steering angle sensor data, wheel speed sensor data, and gear position data; and calculating estimated vehicle heading information at substantially the second moment from the second yaw rate parameters.

7. The method according to claim 6, further comprising calculating a first estimated vehicle position at substantially the second moment based on at least the estimated heading information.

8. The method according to claim 6, further comprising receiving and servicing a request for vehicle heading information during the GPS outage.

9. The method according to claim 6, wherein calculating vehicle heading information at substantially the second moment from the second yaw rate parameters further comprises applying a weighting algorithm.

10. The method according to claim 6, wherein gathering first yaw rate parameters and gathering second yaw rate parameters comprise accessing sensor data via a vehicle bus.

11. The method according to claim 7, further comprising calculating a second estimated vehicle position at substantially a third moment, later in time than the second moment, based on at least the estimated heading information.

12. A non-transitory computer-readable medium including computer-executable instructions or detecting a vehicle location parameter using internally-referenced vehicle sensor information, the internally-referenced vehicle sensor information comprising at least yaw rate information from a yaw rate sensor, the method comprising computer executable instructions, when executed, facilitating performing the steps of:

recording a GPS-based vehicle location at a first time moment;

gathering first yaw rate parameters including yaw rate sensor data, wheel steering angle sensor data, wheel speed sensor data, and gear position data;

calibrating the yaw rate sensor with a software compass application by reference to the GPS-based vehicle location and the first yaw rate parameters, wherein the compass application calibrates the yaw rate sensor by applying a minimization algorithm to a function of a scale factor and a yaw rate bias, and;

at a second time moment after calibration of the yaw rate sensor, detecting a GPS outage such that GPS position data is unavailable;

after the second moment, gathering second yaw rate parameters including yaw rate sensor data, wheel steering angle sensor data, wheel speed sensor data, and gear position data; and calculating estimated vehicle heading information at substantially the second moment from the second yaw rate parameters.

13. The non-transitory computer-readable medium including computer-executable instructions according to claim 12, further comprising calculating a first estimated vehicle position at substantially the second moment based on at least the estimated heading information.

14. The non-transitory computer-readable medium including computer-executable instructions according to claim 12, wherein calculating vehicle heading information at substantially the second moment from the second yaw rate parameters further comprises applying a weighting algorithm.

15. The non-transitory computer-readable medium including computer-executable instructions according to claim 13, further comprising calculating a second estimated vehicle position at substantially a third moment, later in time than the second moment, based on at least the estimated heading information.

* * * * *